(12) United States Patent
Chaiko

(10) Patent No.: US 6,521,678 B1
(45) Date of Patent: *Feb. 18, 2003

(54) PROCESS FOR THE PREPARATION OF ORGANOCLAYS

(75) Inventor: David J. Chaiko, Naperville, IL (US)

(73) Assignee: Argonne National Laboratory, Argonne, IL (US)

( * ) Notice: Subject to any disclaimer, the term of this patent is extended or adjusted under 35 U.S.C. 154(b) by 5 days.

This patent is subject to a terminal disclaimer.

(21) Appl. No.: 09/717,590

(22) Filed: Nov. 21, 2000

(51) Int. Cl.⁷ .................................................. B01J 13/00
(52) U.S. Cl. ....................... 523/333; 501/148; 507/901; 516/100; 516/101
(58) Field of Search .......................... 523/333; 516/101, 516/100; 501/148; 507/901

(56) References Cited

U.S. PATENT DOCUMENTS 6,172,121 B1 * 1/2001 Chaiko ....................... 516/101
6,380,295 B1    4/2002 Ross et al.

* cited by examiner

Primary Examiner—Paul R. Michl
(74) Attorney, Agent, or Firm—Foley & Lardner

(57) ABSTRACT

A method for preparing organoclays from smectites for use as rheological control agents and in the preparation of nanocomposites. Typically, the clay is dispersed in water, and a substantially monomolecular layer of a water soluble polymer is applied to the surfaces of the clay. A surfactant is also applied to the clay to modify the surface hydrophilic/hydrophobic balance of the clay, and the organoclay is separated out for subsequent use.

24 Claims, 5 Drawing Sheets

PROCESS FOR THE PREPARATION OF ORGANOCLAYS

This invention was made with Government support under Contract No. W-31-109-ENG-38 awarded by the U.S. Department of Energy. The Government has certain rights in this invention.

FIELD OF THE INVENTION

The present invention relates to a method for preparing organoclays from clays including clays purified in the conventional manner and also clays purified as described in a U.S. Patent Application entitled "Pseudophasic Extraction Method for the Separation of Ultra-Fine Minerals" having U.S. Ser. No. 09/532,728. More particularly, the invention relates to methods for the surface modification of clays having at least a monomolecular coating of a water-soluble polymer to produce organoclays with improved efficiency and dispersability in aqueous and nonpolar solvents

BACKGROUND OF THE INVENTION

Organoclays with a wide range of surface wetting characteristics have been described in the patent literature. Surface treatment can be used to render hydrophilic clay surfaces compatible with solvents of decreasing polarity such as alcohols, ethers, aromatic and aliphatic hydrocarbons, and the like. Conventional hydrophilic organoclays have been prepared, wherein a smectite-type clay is surface modified by surface exchange with a water-soluble alkoxylated quaternary ammonium surfactant. The resulting materials are dispersable in water-based systems and can be used for rheology control in products such as latex paints. Other methods for preparing organoclays displaying surface properties ranging from hydrophilic to hydrophobic have been produced by surface modification of the clay through polymer adsorption rather than onium ion exchange. Clay/polymer intercalates have been produced through direct intercalation of the clay with either intercalates have been produced through direct intercalation of the clay with either polymer melts or by contacting a clay slurry with a polymer solution followed by drying. These materials are not readily dispersible in aqueous-based systems but can be used in forming composites with thermoplastic or thermosetting resins.

Traditionally, hydrophobic organoclays have been prepared from a smectite-type clay by surface exchange with high-molecular-weigh quarternary amines, such as demethyl dihydrogenated tallow ammonium chloride, dimethyl benzyl hydrogenated tallow ammonium chloride, and methyl benzyl dihydrogenated tallow ammonium chloride. Another variation described in the literature for making organoclays involves preparation of a hydrophobic organoclay by onium ion exchange followed by intercalation of a hydrophilic or hydrophobic polymer melt. However, this method of producing organoclays does not directly bind the organic polymers to the clay surface. Consequently, these organoclays cannot be dispersed in a solvent system without loss of the polymer from the clay surface which leads to uncontrolled changes in the surface wetting properties of the organoclay. Additionally, these types of organoclay intercalates do not completely exfoliate in the absence of specific chemical polymerization reactions. This method of producing organoclays is further limited to organoclays that have been surface treated with onium ions having carbon chain lengths equal to or greater than 12. The present invention overcomes these, and other problems associated with the production of organoclays.

It is therefore an object of the present invention to provide a novel method for making an organoclay product with enhanced compatibility with aqueous, hydrophilic and hydrophobic systems.

It is another object of the present invention to provide an improved method for making an organoclay product that is fully dispersible in aqueous, hydrophilic and hydrophobic solvents.

It is yet another object of the present invention to provide a novel method for making an organoclay product that is produced with shorter chain onium ions than have been previously produced.

It is another object of the invention to provide an improved method for more precisely controlling the hydrophilic/hydrophobic balance of the clay surface.

It is yet another object of the present invention to provide a novel method for making an organoclay product that is highly dispersible in a solvent system.

It is still another object of the present invention to provide an improved method for making an organoclay having structural and chemical properties which are superior to conventional organoclays for use in the preparation of nanocomposites.

It is another object of the present invention to provide a novel method for making organoclays that can be dispersed in a solvent system without a loss of polymer from the clay surface.

Other objects and advantages of the invention will become apparent by review of the detailed description of preferred embodiments.

SUMMARY OF THE INVENTION

The present invention discloses a method for preparing organoclays from clay for use in water treatment applications, as Theological control agents, and in the preparation of nanocomposites. Typically, the clay is dispersed in water, and at least a substantially monomolecular layer of a low-molecular-weight, water-soluble polymer is applied to the basal surfaces of the clay. The clay may include without limitation, kaolin clays, smectite clays, and subgroups thereof including hectorite, montmorillonite, beidelite, stevensite, and saponite clays. A surfactant or surface-modifying polymer is also applied to the clay to modify the hydrophilic/hydrophobic balance (HLB) of the clay surface. Optionally, the resulting organoclay is filtered and dried for subsequent use. Preferably, the organoclay is dried to a moisture content less than about twelve percent by weight. Organoclays designed for use in the preparation of nanocomposites are more preferably dried to a moisture content of less than two percent by weight, and most preferably dried to a moisture content less than 0.5-1 weight percent. Sodium exchange of clays containing multivalent cations in exchange sites, such as, for example, calcium and magnesium, can be accomplished by utilizing an inorganic salt, which also functions to drive exchange reactions with low-molecular-weight onium ions. The disclosed method can further utilize a drying agent which is added to the organoclay prior to drying thereof.

The above described objects and embodiments are set forth in the following description and illustrated in the drawings described hereinbelow.

DETAILED DESCRIPTION OF THE PREFERRED EMBODIMENTS

Figure 1:
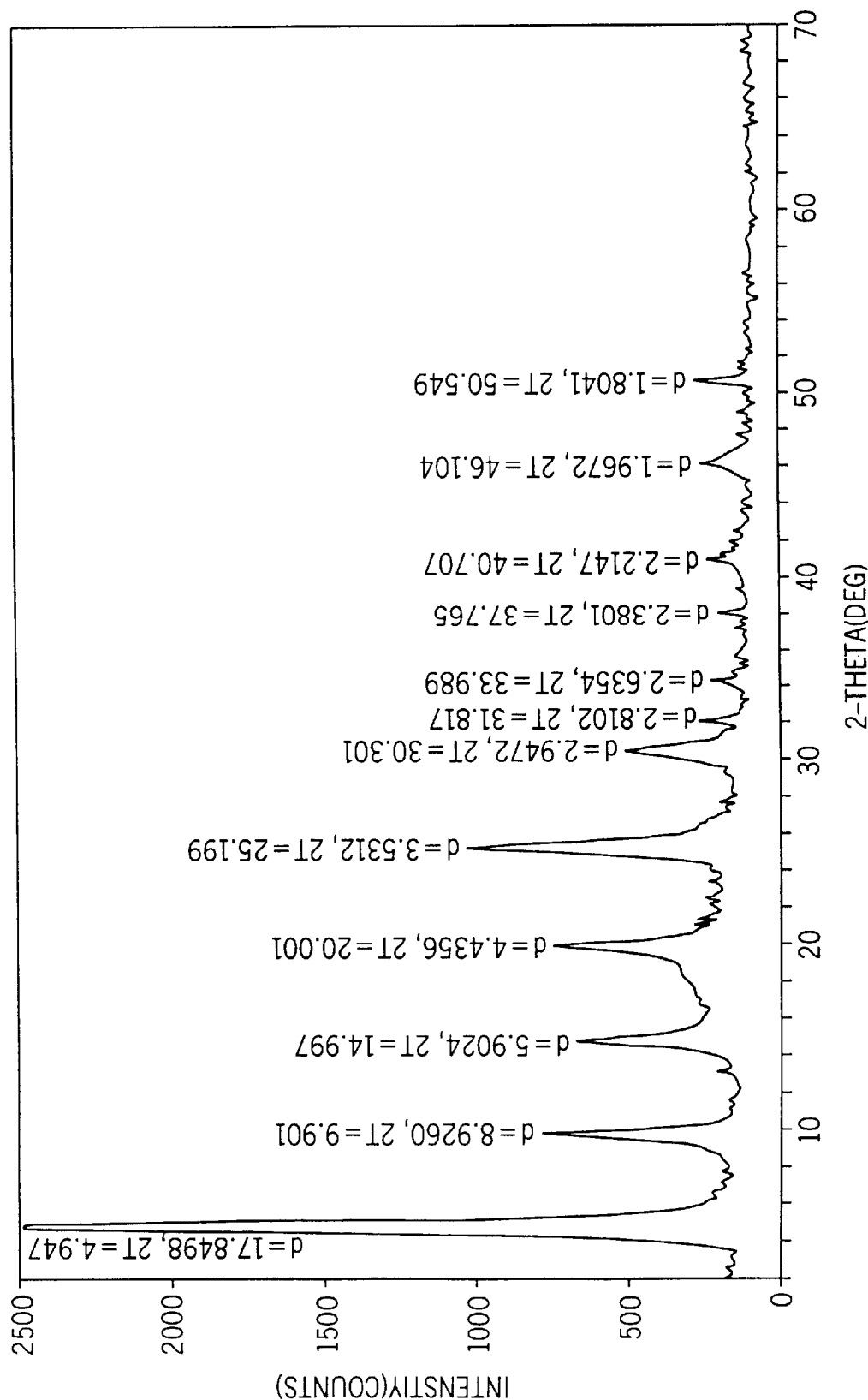
FIG. 1 is an X-ray pattern of a dried organoclay.

In one embodiment, the process includes the dispersion of the clay in water at a solids concentration of preferably about 3 to 5 weight percent, and most preferably using high shear, particle size separation methods including screens, hydrocyclones, and centrifuges. Higher clay concentrations may be employed in the presence of an appropriate dispersant. Preferably the clay has been pre-purified utilizing conventional techniques, however pre-purification is not required. A low-molecular-weight, water-soluble polymer is added to the clay slurry in an amount sufficient to produce at least a substantially monolayer coating on the clay surfaces. In a preferred embodiment, the water soluble polymer can be added to form a greater than monolayer coating of the surfaces of the clay. Examples of low-molecular weight water-soluble polymers that are suitable for use in the present invention include without limitation polyethylene glycol, polypropylene glycol, methoxypolyethylene glycol, copolymers of polyethylene glycol/polypropylene glycol, and polyethylene glycol/polybutylene glycol. For example, in the case of the adsorption of polyethylene glycol onto a smectite clay, the amount of polymer added will generally be about twenty seven weight percent relative to the weight of the smectite clay. This polymer addition can be done at room temperature or at elevated temperatures of between about 30 to 70° C. to aid in the hydration and dispersion of the clay. Preferably, the clays can be sodium exchanged if originally present in the calcium or magnesium forms. In a preferred form of the invention, a thixotrope with improved efficiency and dispersability can be produced and thus can be accomplished by modifying the HLB value of the clay surface by the addition of a surfactant. Suitable surfactants include without limitation amine-type surfactants, phosphonium salt surfactants, sulfonium salt surfactants, carboxylated alcohol surfactants, ethoxylated alcohols, and alkylaryl polyether alcohols. The surface HLB value of the clay can also be modified by addition of a low-molecular-weight hydrophobic polymer such as polypropylene glycol or polymethylene glycol. By varying the surface HLB value, a wide range of organoclays can be generated which are compatible with either aqueous systems or hydrophilic and hydrophobic solvent systems. The surface HLB value can be varied by choosing an appropriate surfactant or controlling the amount of the surfactant added to the clay. Specific examples illustrating the control over the HLB value of the surface of the clay are illustrated below.

Organophilic clay is typically produced as follows. The clay is dispersed in water at a solids concentration of preferably about 3 to 5 weight percent. Application of heat or high shear can be used to ensure that the individual clay platelets are completely hydrated and exfoliated. A nonionic, water-soluble polymer is added preferably at a concentration sufficient to form at least substantially a monolayer coating on the basal surfaces of the clay platelets. This step is typically carried out under low shear mixing so as not to damage the polymer. A surfactant is added, preferably at a temperature of about 50 to 70° C. Examples of surfactants which are suitable to produce organophilic clays include at least quaternary amines, preferably having at least an R-chain of ten carbons or greater, phosphonium salts, and sulfonium salts. For water-dispersible materials the amine conversion will generally range from about 5 to 20 percent of the cation exchange capacity of the clay.

To produce organoclays readily dispersible in nonaqueous systems, the amine conversion as described above is carried out to the extent necessary to produce a hydrophobic surface compatible with the desired solvent system. Typically, this requires 50 to 100 percent conversion of the cation exchange capacity of the clay. The organoclay is separated and recovered preferably by filtration. The clay can then be further dewatered by pressure filtration to a solids content of about 50 to 65 weight percent. The organoclay can also be washed with water to remove the sodium salt produced during the amine exchange reaction. The hydrophobic organoclay is preferably thermally dried to a residual moisture content of about 1 to 2 weight percent or less and crushed to a fine powder. Optionally, a drying aid can be blended with the organoclay prior to drying. The drying aid can be any hydrophobic chemical agent or polymer, and preferably does not have an appreciable vapor pressure at the temperature at which the clay is dried. Utilizing the drying aid will assist in the direct production of a fine powdered product without the need for grinding. Examples of suitable drying aids include at least polypropylene glycol and copolymers of polyethylene glycol/polypropylene glycol with low HLB values.

Water-dispersible organoclay is typically produced as follows. The clay is dispersed in water, preferably at a solids concentration of about 3 to 5 weight percent, although higher solids concentrations are usable if a proper dispersant or method is employed to control viscosity. Application of heat or high shear can be used to ensure that the individual clay platelets are completely hydrated and exfoliated. The slurry can also contain a salting-out agent to exchange metal ions in the clay, for example exchanging calcium and magnesium ions with sodium ions in cation exchange positions of the clay. Examples of salting-out agents include at least sodium sulfate, sodium carbonate, sodium phosphate, sodium hexametaphosphate, and tetrasodium pyrophosphate. In a preferred embodiment, the salting-out agents are added at a concentration of about 1 to 3 weight percent. A nonionic, water-soluble polymer is also added at a concentration sufficient to form substantially a monolayer coating on the basal surfaces of the clay. This step is carried out under low shear mixing, and a surface modifying agent is also added. For example, compatible surface modifying agents include at least low-molecular-weight quaternary amines containing at least one R chain of 3 to 10 carbons, phosphonium salts, and sulfonium salts. Sodium salt produced during the amine exchange can be removed by contact with a mixed-bed ion exchanger. The conductivity of the slurry should preferably be reduced to about 100–500 microsiemens per cm or less prior to use or drying of the organoclay. The organoclay is dried in a manner which produces a flake product having a thickness between about 10 to 500 micrometers and more preferably between about 50 to 100 micrometers. Drying temperatures at or below about 120° C. are typically employed.

The disclosed processes, which involve the attachment of a water-soluble polymer followed by quaternary amine exchange, make it possible to randomly attach low-molecular-weight amines onto the basal clay surfaces without the interstratification that is normally observed during substoichiometric exchange reactions in smectites.

Additionally, the disclosed approach produces materials that are easy to dry and redisperse. Furthermore, the disclosed approach permits more precise control over the surface HLB value than previously disclosed methods of producing organoclays. The present disclosure, by virtue of using separate polymeric and surfactant modifiers provides control over spatial orientation of the hydrophilic and hydrophobic reagents on the clay surface that is not reproducible with the compounds described in prior art methods. The organoclays produced with the disclosed process yield materials that are fully dispersible and therefore require 0.5 weight percent or less to impart thixotropic behavior in latex paint systems. In addition, the method of drying is of importance in producing organoclays that will substantially completely exfoliate when dispersed in water-based systems. To aid in dispersion of the organoclays, materials such as are described in U.S. Pat. 5,728,764 (which is incorporated by reference herein) contain an amount of quaternary amine that ranges between about 100 to 130 percent of the cation exchange capacity of the clay. The quaternary amine compounds used in the instant invention are preferably not beyond about 100 percent of the cation exchange capacity of the clay, and more preferably not beyond about 90 percent of the cation exchange capacity of the clay. In applications where the clay is to be dispersed in aqueous systems, high-molecular-weight quaternary amines are typically added at levels below about 2 to 5 percent of the cation exchange capacity.

The following non-limiting examples serve to further illustrate advantages of the disclosed invention.

EXAMPLE 1

An organophilic clay was prepared from conventionally purified montmorillonite. The clay was dispersed in deionized water at a solids concentration of 3 weight percent. A stoichiometric amount of poly(ethylene glycol), molecular weight of 1500, was added to the clay dispersion to produce a hydrophilic organoclay with the composition 0.27 g polyethylene glycol/g clay. Following equilibration for 10 min, a stoichiometric amount of didecyldimethylammonium bromide approximately equivalent to the cation exchange capacity of the clay was added to the suspension at 50° C. and stirred for 20 min. The organophilic product was filtered from the aqueous suspension, washed with water, and dried at 90° C. Chemical analysis of the product revealed that it contained 28 weight percent quaternary amine and that the concentration of poly(ethylene glycol) on the surface of the clay had been reduced from 27 weight percent to 10.6 weight percent. Within the error of the measurement, the remaining equivalents of poly(ethylene glycol) agreed stoichiometrically in a 1:1 mole ratio with the equivalent cationic charge from exchangeable sodium and calcium ions remaining on the clay surface. Without limiting the scope of the invention, this result suggests that the primary mode of polymer attachment is through ion-dipole interactions and that the polymer leaves the surface in approximately direct proportion to the extent of quaternary amine exchange. However, a substantially different mode of polymer attachment coexists and is evidenced by the stoichiometric relationship between the remaining inorganic cation charge and the adsorbed poly(ethylene glycol). X-ray diffraction analysis of the dried organoclay indicated a basal spacing of 25.9 Å. The product was completely dispersible in aliphatic solvents such as dodecane and X-ray analysis of 5 to 10 weight percent dispersions in dodecane showed a lack of basal reflections indicating that the clay had been exfoliated.

| Chemical Analysis, in weight percent, of Organophilic Clay Product | | | | | |
|---|---|---|---|---|---|
| Na | Ca | N | Amine | PEG | LOI |
| 0.11 | 0.05 | 1.2 | 27.9 | 10.6 | 38.6 |

EXAMPLE 2

A water-dispersible organoclay was prepared by dispersing a conventionally purified montmorillonite, that had been sodium exchanged, in deionized water at a solids concentration of 4 weight percent. A stoichiometric amount of poly(ethylene glycol) was added to the clay dispersion to produce a hydrophilic organoclay with the composition 0.27 g poly(ethylene glycol)/g clay. Following equilibration for 10 min, a substoichiometric amount of didecyldimethylammonium bromide was added to the suspension at 50° C. and stirred for 20 min. The organoclay remained dispersed in the aqueous phase. The suspension was contacted with a mixed-bed ion exchanger to remove NaBr and any unreacted quaternary amine. X-ray diffraction analysis of the dried organoclay indicated a basal spacing of 17.8Å.

EXAMPLE 3

This example illustrates the use of a short chain quaternary amine to selectively produce a hydrophobic organoclay in the presence of trace mineral impurities. It also illustrates the effect of drying conditions on the surface chemical properties of the organoclay. An organophilic clay was prepared from conventionally purified montmorillonite. The clay was dispersed in an aqueous poly(ethylene glycol) solution containing 3 weight percent sodium sulfate and at a clay concentration of 3 weight percent. A stoichiometric amount of poly(ethylene glycol) was used to produce a hydrophilic organoclay with the composition 0.27 g poly (ethylene glycol)/g clay. The presence of the polymer stabilized the clay suspension in the presence of the sodium sulfate. Following equilibration for 10 min, the pH was reduced to 3.5 with sulfuric acid and a stoichiometric amount of hexylamine acetate, equivalent to the cation exchange capacity of the clay, was added to the suspension at 50° C. and stirred for 20 min. The effect of the sodium A sulfate was to salt out the low-molecular-weight amine and thereby drive the onium ion exchange reaction to completion. The organophilic product was filtered from the aqueous suspension, washed with water, and redispersed in a 35 weight percent n-propanol/water solution to produce a colorless, transparent clay dispersion. This clay dispersion was then dried at 110° C. to produce an oriented film. X-ray analysis of the dried organoclay indicated a basal spacing of 17.8 Å (see FIG. 1). The X-ray data also showed that the quartz impurity originally present in the clay feed had been removed during the organoclay conversion process. The combination of low pH and low molecular weight amine produced selective attachment of the quaternary amine to the clay making it hydrophobic while leaving the quartz impurity with an unaltered, hydrophilic surface. The quartz removal was effected when the organoclay floated to the top of the aqueous phase and was collected. A further reduction in quartz concentration occurred when the clay was dispersed in the aqueous propanol solution while the quartz, being hydrophilic, did not disperse.

It was also discovered that the method of drying affected the surface characteristics of the clay even though the X-ray diffraction revealed a constant d(001) reflection of 17.8 Å for all products. The organoclay that was dried in an oriented film was dispersible in water and propanol/water mixtures while the organoclay that was dried in powder form directly from the water-washed product was not capable of being wetted by water.

EXAMPLE 4

This example illustrates the Theological properties of the organoclays containing a 2-dimensional amphiphilic coating. The organoclay produced in Example 2 was used to prepare a latex paint having the following composition:

| Material | Weight percent |
|---|---|
| Grind | |
| Ti-PURE ® R-942 | 20.0 |
| Tamol ® 731A | 0.4 |
| Organoclay | 0.4 |
| Water | 9.6 |
| Imsil ® A-15 | 15.3 |
| Triton ® X-100 | 0.1 |
| NOPCO NDW ® | 0.15 |
| Let Down | |
| UCAR ® latex 123 | 51.0 |
| Texanol ® | 0.6 |
| Propylene glycol | 2.0 |

Figure 2:
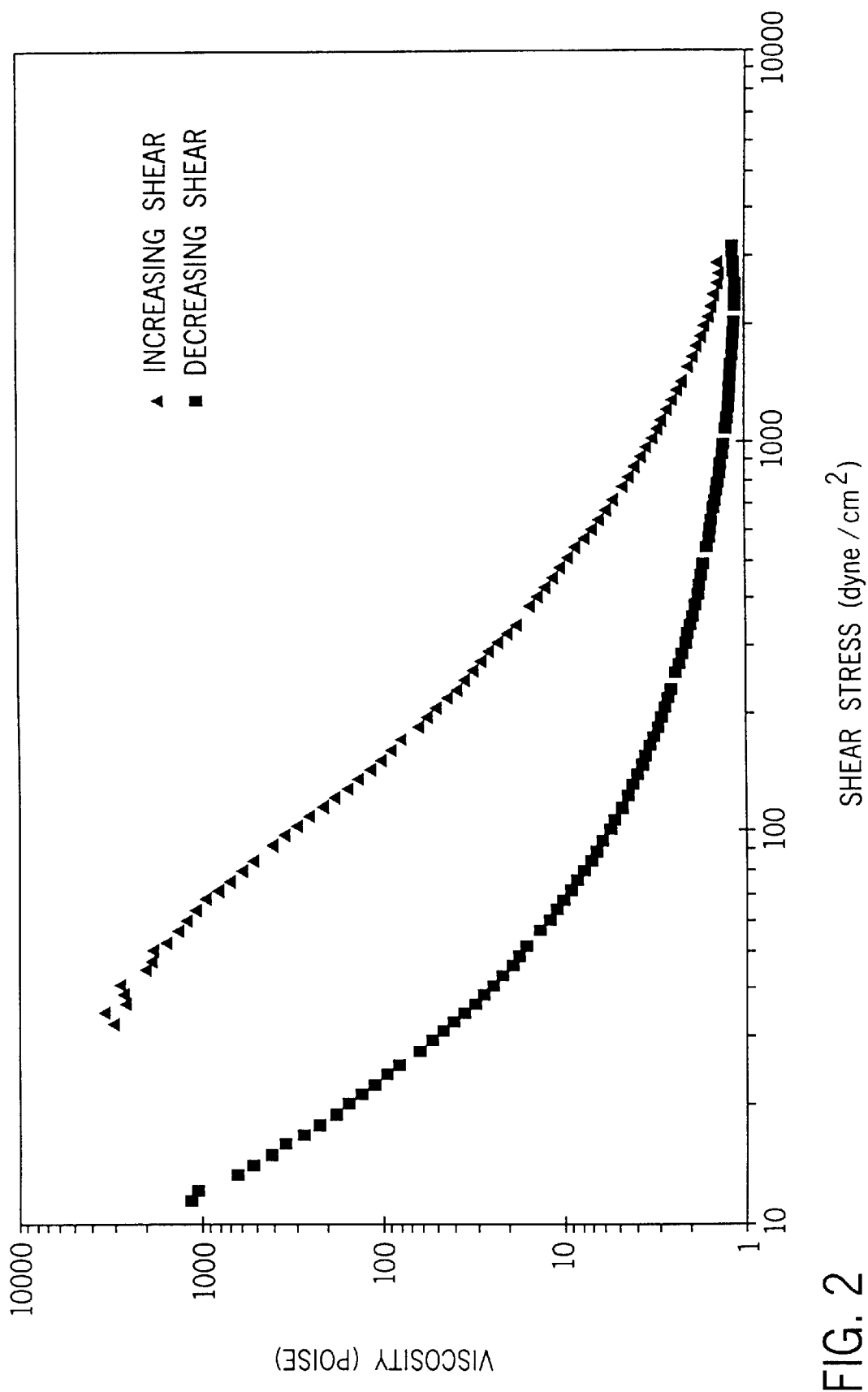
FIG. 2 depicts the viscosity profile of a latex paint containing an organoclay produced by the present invention.

The pH of the paint was 8.3. The rheology of the paint was examined using a Brookfield, cone and plate viscometer. The viscosity profile of the latex paint is shown in FIG. 2.

EXAMPLE 5

This example illustrates the Theological properties of the organoclays containing a 2-dimensional amphiphilic coating. The organoclay produced in Example 3 that was dried in an oriented film was used to prepare a latex paint having the following composition:

| Material | Weight Percent |
|---|---|
| Grind | |
| Ti-PURE ® R-942 | 20.0 |
| Anti Terra U | 0.6 |
| Organoclay | 0.4 |
| Water | 9.6 |
| Imsil ® A-15 | 15.3 |
| Triton ® X-100 | 0.1 |
| NOPCO NDW ® | 0.15 |
| Let Down | |
| UCAR ® latex 123 | 51.0 |
| Texanol ® | 0.6 |
| Propylene glycol | 2.0 |

Figure 3:
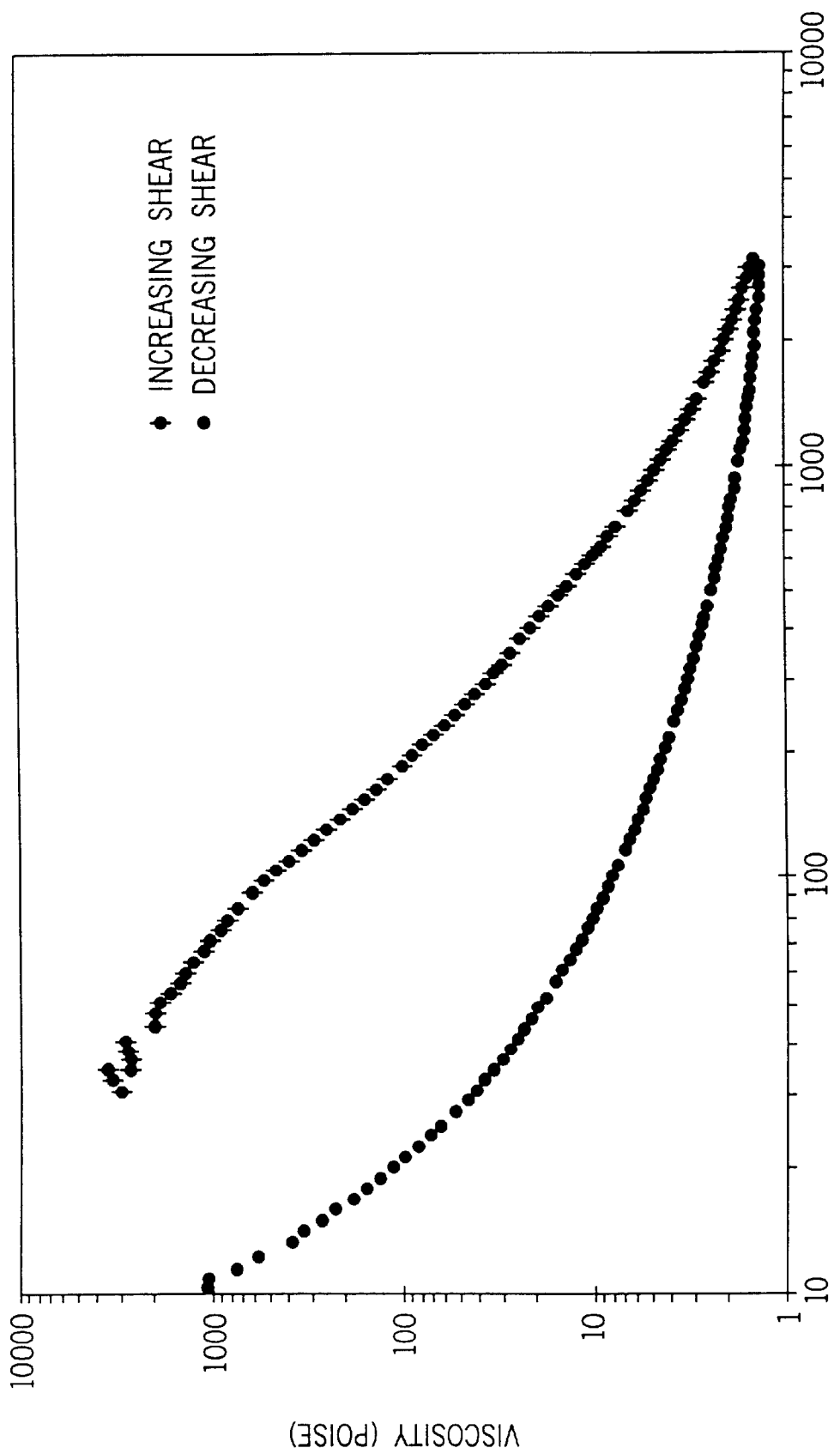
FIG. 3 depicts the viscosity profile of another latex paint containing an organoclay produced by the present invention.

The pH of the paint was 8.3. The rheology of the paint was examined using a Brookfield, cone and plate viscometer. The viscosity profile of the latex paint is shown in FIG. 3.

EXAMPLE 6

This example illustrates the use of a drying aid to maintain dispersability of the organoclay after drying. An organoclay was prepared by adsorbing a monolayer of poly(ethylene glycol) onto the basal surface of a montmorillonite clay. When the organoclay is produced under low pH conditions, protonation of the exchange sites on the clay leads to a d(001) spacing that ranges from approximately 14 to 16.5 Å depending on the degree of surface protonation. The unusually small spacing is observed even though the organic loading is approximately 30 to 35 weight percent and is identical to materials treated with a dilute caustic wash before drying. This reduction in d(00) spacing is also observed in organoclays containing monolayer coatings of poly(ethylene glycol). These materials in which the basal spacing is below 17 Å do not disperse in either aqueous or organic solvent systems. This pH sensitivity can be overcome by use of an appropriate drying aid which helps to maintain a basal spacing of 17 Å or greater. Before drying, propylene glycol was blended with the organoclay of the present example and dried at 110° C. This produced an organoclay that was easy to dry and grind and which displayed a d(001) spacing of 17.5 Å. Amounts of propylene glycol ranging between about 1 to 15 weight percent resulted in useful end product organoclay.

EXAMPLE 7

Figure 4:
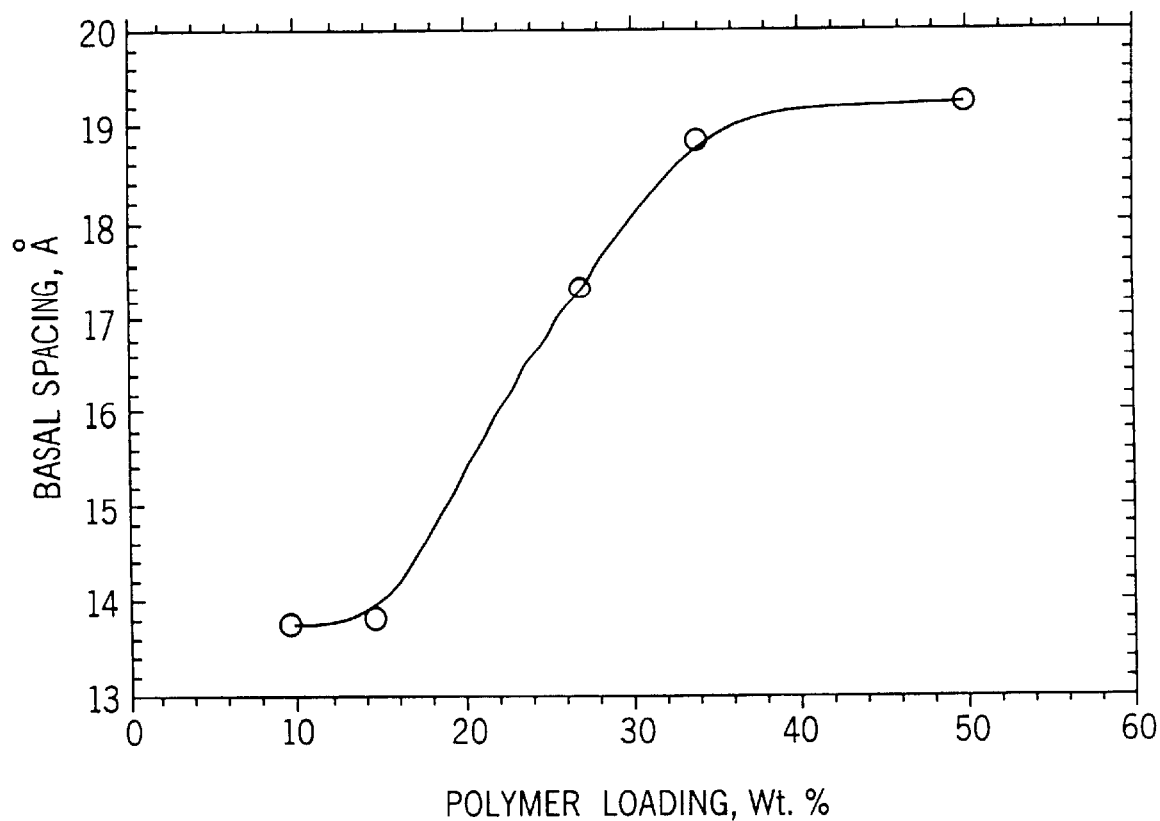
FIG. 4 depicts the basal spacing of an organoclay as a function of polymer loading for an organoclay produced by the present invention.
Figure 5:
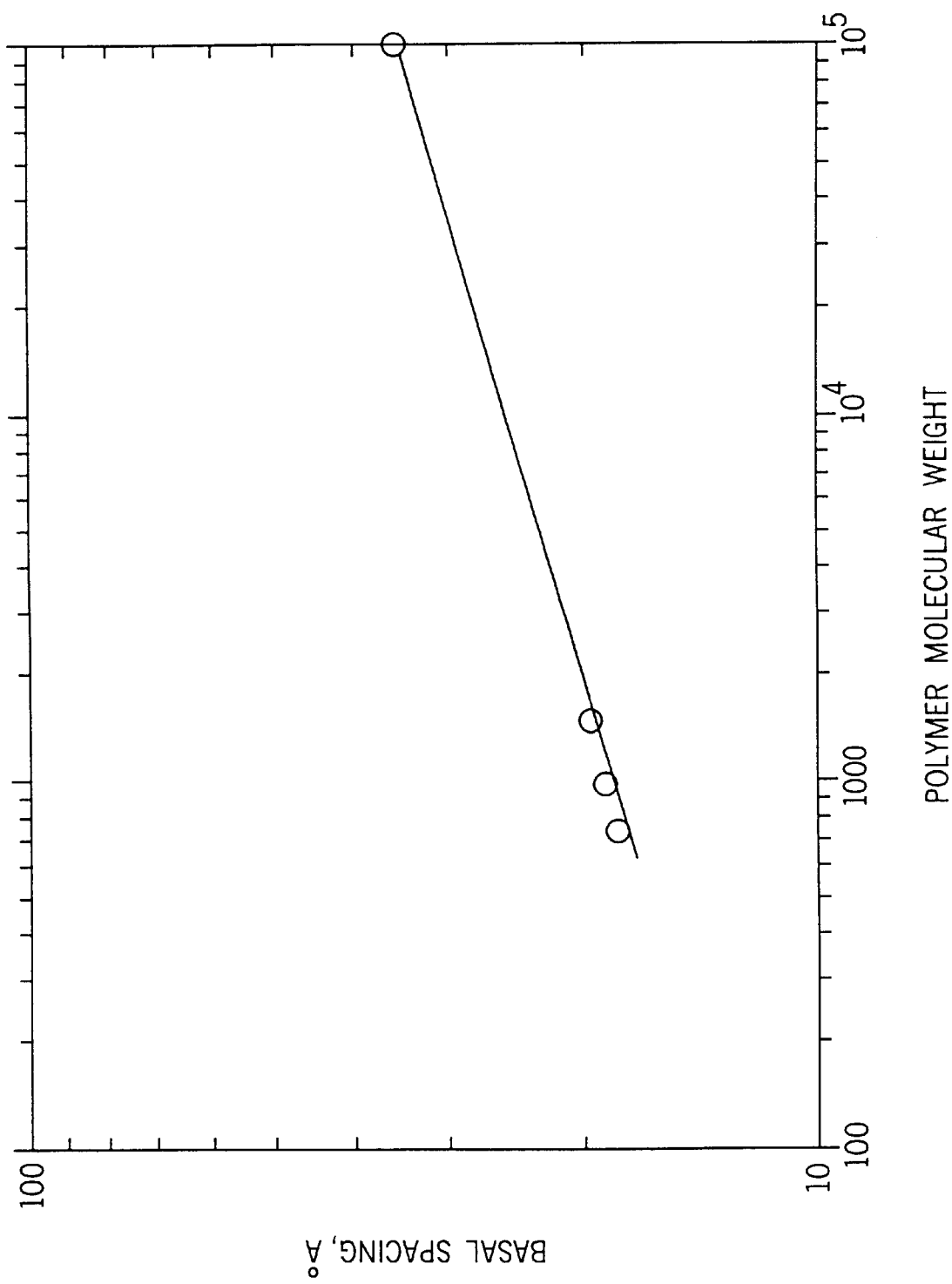
FIG. 5 depicts the relationship between basal spacing and polyethylene glycol molecular weight for organoclays produced by the present invention.

This example illustrates the preparation of an organoclay containing polyethylene glycols that are adsorbed to the clay surface through oxonium exchange. A series of organoclays with varying polyethylene glycol loading were prepared from a purified saponite that was treated with a cation exchange resin to convert the clay to the fully protonated form. The organoclays, loaded with a 1500 molecular weight polymer were dried and basal spacing measured by X-ray diffraction. The basal spacing of the organoclays ranged from approximately 14 Å at a polymer loading of about 15 wt % to 19.8 Å at a polymer loading of about 50 wt % as shown in FIG. 4. Previous attempts to adsorb polyethylene glycols to levels above about 30 wt % have always resulted in the formation of two phases—a clay/polymer composite with a basal spacing of 17.8 Å and a separate crystalline polymer phase. The basal spacing of 17.8 Å was always independent of polyethylene glycol molecular weight. The organoclays prepared in the present example, and containing over 30 wt % polyethylene glycol, did not show the characteristic diffraction peaks of the polymer, indicating that only a single clay/polymer phase had been produced. In addition, the basal spacings greater than 17.8Å suggest, without limiting the scope of the invention, that greater than monolayer adsorption of the polymer had occurred. The effect of polymer molecular weight on basal spacing shown in FIG. 5 further suggests, again without limiting the scope of the invention, that the polymer is adsorbed as an oxonium cation that is formed by protonation of a terminal hydroxyl group. Similar evidence of polymer attachment through stoichiometric interaction with exchangeable cations was observed in the preparation of the organoclay described in EXAMPLE 1 of the present invention. Further evidence of the unique nature the polymer attachment is provided by differential scanning calorimetry (DSC). Published DSC data indicate the polyethylene glycol that is adsorbed onto sodium exchanged clays is distinctly different from the crystalline polymer phase since it does not exhibit a melt transition characteristic of the pure polymer but does show a thermal decomposition temperature of approximately 360° under anoxic conditions. However, the DSC data for materials prepared in the present Example, which had basal spacings above 17.8 Å, did exhibit a melt transition that was slightly higher than that of the pure poly(ethylene glycol) polymer.

The presence of melt and crystallization transitions in the DSC data and the lack of polymer diffraction peaks, together with expanded basal spacing suggest that a single-phase clay intercalate was produced.

EXAMPLE 8

This example illustrates the use of a high molecular weight amine to alter the surface HLB value of a hydrophilic organoclay making it dispersible in nonpolar organic systems. A hydrophilic organoclay was prepared from a saponite which had been purified by the pseudophasic extraction process using aminotri (methylene-phosphonic acid), pentasodium salt as a sodium exchange agent and clay dispersant at a level of 3 weight percent relative to the weight of the clay. The purified clay, containing a monolayer of adsorbed poly(ethylene glycol) was further treated with methyl bis(2-hydroxyethyl) tallow ammonium chloride at an exchange level of 90 meq/100 g clay. The quaternary amine was added to the clay slurry with stirring at 65° C. The clay was recovered by filtration and dried at 60° C. The presence of the quaternary amine, together with the remaining portion of poly(ethylene glycol), produced a reduction in the surface HLB value to the extent that the organoclay was no longer dispersible in water. The organoclay was, however, dispersible in high-molecular-weight poly(propylene glycol). A 10 weight percent organoclay dispersion in poly(propylene glycol), having a formula weight of 2,000, did not show a basal reflection on the x-ray diffraction pattern suggesting that the organoclay was exfoliated. Crosslinking the poly(propylene glycol) with a stoichiometric amount of toluene 2,4-diisocyanate produced a transparent polyurethane nanocomposite in which the clay remains exfoliated.

EXAMPLE 9

This example illustrates the use of a surface-modifying polymer to alter the surface HLB value of the hydrophilic organoclay to make it dispersible in polar organic solvents. A water-dispersible organoclay was prepared from a saponite ore by treatment with the pseudophasic extraction process. The purified organoclay, containing a monolayer of adsorbed poly(ethylene glycol) was further treated, bringing the total organic content to 50 weight percent, by the addition of an aqueous solution of poly(1-vinylpyrrolidone-co-acrylic acid) that had been neutralized by a stoichiometric amount of ammonium hydroxide. The organoclay suspension was dried and ground to produce an organoclay that had a basal spacing of 22.5 Å and was dispersible in polar organic solvents such as ethylene glycol and propylene glycol. Dispersion of the organoclay in ethylene glycol produced a noticeable thickening of the solvent and at organoclay concentrations of 5 to 10 weight percent produced a shear thinning gel. The x-ray diffraction pattern of the dispersion showed an absence of any basal reflections indicating that the organoclay was exfoliated.

Without limiting the scope of the present invention, the attachment of the poly(1-vinylpyrrolidone-co-acrylic acid) to the clay surface is believed to occur through oxonium ion formation. Heating the suspension, in addition to removing the water, drives off the ammonia thereby producing a hydrogen bond between the ether oxygens of the poly(ethylene glycol) and the acrylic acid functionality.

While preferred embodiments have been illustrated and described, it should be understood that changes and modifications can be made therein in accordance with one of ordinary skill in the art without departing from the invention in its broader aspects. Various features of the invention are defined in the following claims.

What is claimed is:
1. A method for preparing organoclays from clay comprising:
   dispersing the clay in water;
   applying at least a substantially monomolecular layer of water soluble polymer to the clay;
   applying a surfactant to the clay, thereby modifying hydrophilic/hydrophobic balance of surfaces of the clay; and
   separating out the organoclay.
2. The method of claim 1 further comprising drying the organoclay to a moisture content less than about twelve percent by weight.
3. The method of claim 2 further comprising adding a drying agent to the organoclay prior to drying thereof.
4. The method of claim 3 wherein the drying agent is selected from the group consisting of propylene glycol, ethylene glycol and mixtures thereof.
5. The method of claim 1 further comprising the step of utilizing an inorganic salt to exchange salt ions with the clay.
6. The method of claim 5 wherein the inorganic salt is selected from the group consisting of sodium carbonate, sodium phosphate, sodium hexametaphosphate, tetrasodium pyrophosphate, and polyfunctional phosphonic acid salts.
7. The method of claim 1 wherein the water soluble polymer is selected from the group consisting of poly(ethylene glycol), poly(propylene glycol), methoxypolyethylene glycol, copolymers of polyethylene glycol and polypropylene glycol, and copolymers of poly(ethylene glycol) and poly(butylene glycol).
8. The method of claim 1 wherein the clay is dispersed in water to a solids concentration in the range of about three to five percent.
9. The method of claim 1 wherein during dispersal of the clay in water, the clay is substantially hydrated and exfoliated.
10. The method of claim 1 wherein the surfactant which modifies the hydrophilic/hydrophobic balance of the surfaces of the clay is selected from the group consisting of surfactants of amine-type, phosphonium salt type, sulfonium salt type, carboxylated alcohol type, and alkylaryl polyether alcohol type.
11. The method of claim 1 wherein the clay is selected from the group consisting of smectite and kaolin clays.
12. The method of claim 1 wherein the clay is selected from the group of clays consisting of hectorite, montmorillonite, beidelite, stevensite, and saponite clays.
13. The method of claim 1 wherein the organoclay is dried to a flake having a thickness in the range of about 50 to 100 micrometers.
14. The method of claim 5 wherein the inorganic salt utilized to exchange salt ions with the clay is present in a concentration of about one to three percent.
15. The method of claim 1 wherein the organoclay is in an oriented film.
16. The method of claim 1 further comprising the step of removing the salt produced when the clay is converted to an organoclay prior its separation.
17. The method of claim 1 wherein the basal spacing of the organoclay is greater than about 17.8 Å.
18. The method of claim 1 wherein the water soluble polymer is adsorbed onto the surface of the clay.
19. The method of claim 1 wherein a greater than monolayer coating of the water soluble polymer is adsorbed onto the surface of the clay.

20. The method of claim 1 wherein the water soluble polymer is adsorbed onto the surface of the clay in an amount greater than about 30 percent weight of the clay.

21. The method of claim 1 further comprising applying a polymer modifying agent to the clay to further modify the hydrophilic/hydrophobic balance of the surfaces of the clay.

22. The method of claim 21 wherein the polymer modifying agent is adsorbed onto the surfaces of the clay.

23. The method of claim 22 wherein the adsorption of the polymer modifying agent occurs through oxonium ion formation.

24. The method of claim 21 wherein the polymer modifying agent comprises neutralized poly(l-vinylpyrrolidone-co-acrylic acid).

* * * * *

UNITED STATES PATENT AND TRADEMARK OFFICE
CERTIFICATE OF CORRECTION

PATENT NO.    : 6,521,678 B1
DATED         : February 18, 2003
INVENTOR(S)   : Chaiko It is certified that error appears in the above-identified patent and that said Letters Patent is hereby corrected as shown below:

Title page,
Item [73], Assignee, "Argonne National Laboratory" is deleted and
-- The University of Chicago -- is inserted.

Column 1,
Line 47, "weigh", change to -- weight --.

Column 2,
Line 36, "Theological", change to -- rheological --.

Column 6,
Line 45, "sodium A sulfate", change to -- sodium sulfate --.

Column 7,
Lines 9 and 36, "Theological", change to -- rheological --.

Column 8,
Line 7, "d(00)", change to -- d(001) --.

Signed and Sealed this

Thirtieth Day of March, 2004

JON W. DUDAS
*Acting Director of the United States Patent and Trademark Office*